United States Patent Office 3,353,944
Patented Nov. 21, 1967

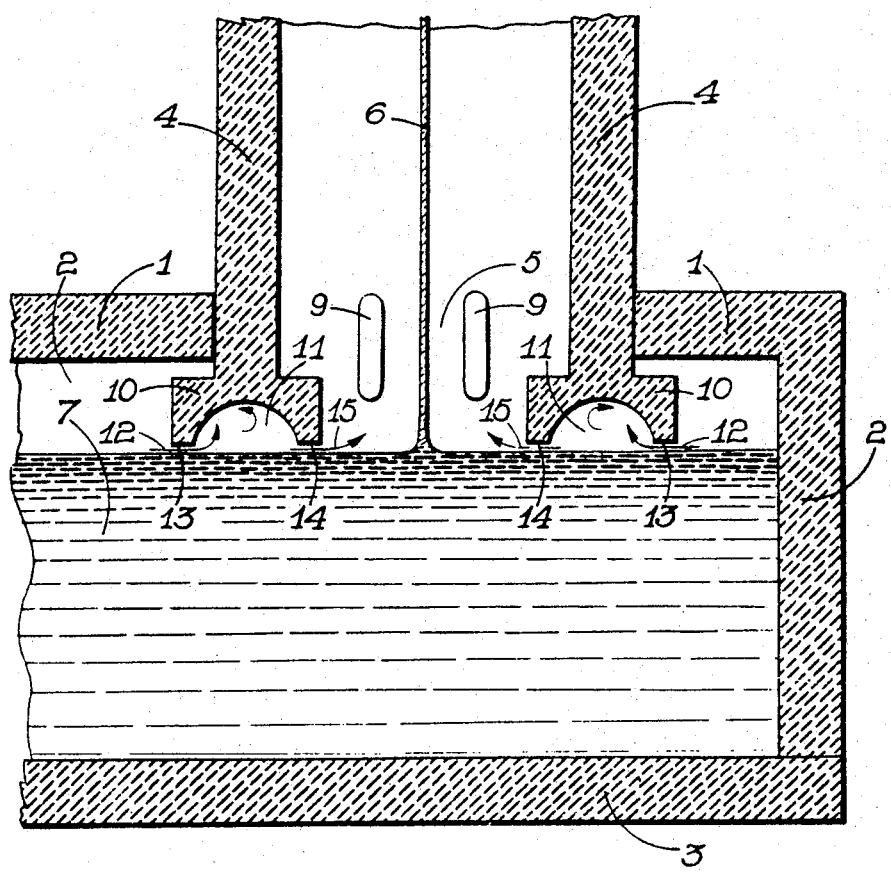

3,353,944
MEANS FOR THE THERMAL HOMOGENISATION OF GLASS FOR THE PURPOSE OF DRAWING IT IN SHEET FORM
Gustave Javaux, Brussels, Belgium, assignor to Glaverbel, Watermael-Boitsfort, Belgium, a Belgian company
Filed Sept. 10, 1963, Ser. No. 307,842
Claims priority, application Belgium, Oct. 31, 1962, 499,149
2 Claims. (Cl. 65—203)

The present invention is concerned with the manufacture of sheet glass by drawing and more particularly with the thermal homogenisation of the glass feeding the base of the sheet.

In the various drawing processes which are employed, the sheet is drawn from the surface of a molten glass bath. The sheet drawn vertically passes between cooling means situated in the drawing chamber at a certain distance from each face of the sheet and parallel to the latter, and at a small distance from the glass bath. These cooling means contribute to the solidification of the sheet. According to the Pittsburg and Fourcault processes, the sheet is then entrained into a long vertical shaft, where the progressive cooling thereof assure a suitable annealing, whereas according to the Colburn process, after the sheet has passed between the cooling means, the sheet is curved while still in the plastic condition over a roller and is directed into a horizontal annealing section, where it is completely solidified, annealed and cooled.

The glass sheets obtained by drawing are generally affected by characteristic defects which are in the form of striations, corrugations and indentations. The main cause of these defects is the thermal heterogeneities of the glass feeding the base or foot of the drawn sheet, these being produced by heterogeneous gas currents which circulate on the surface of the glass bath and reach the said base of the sheet. These currents, which are directed towards the drawing chamber, are supplied on the one hand by the admissions of hot gas originating from the molten furnace and possibly from the heating chamber of the pot or crucible, when one is included in the arrangement, and on the other hand by admissions of external cold air through the openings which cannot be completely sealed off. The currents of hot gas and cold air, which do not have time to become mixed, circulate close to the glass bath and create local temperature differences in the upper layer of the said bath and in the base of the sheet.

Attempts have been made to prevent the circulation of these undesirable gas currents by isolating the drawing chamber from the remainder of the compartment by baffles or walls of refractory materials with their base disposed very close to the glass bath. The bases of these walls have in fact been made in the form of a flat horizontal surface which, under the effect of radiation, should normally serve as an automatic regulator of the temperature of the surface layer of the subjacent glass bath. Nevertheless, this arrangement did not provide the improvement which was hoped for. Not only do these walls not prevent the admission of gaseous currents into the drawing chamber, but due to their proximity to the glass bath, they force the gases which infiltrate beneath them to circulate at high velocity in the form of laminar currents composed of thermally heterogeneous streams, the action of which on the glass bath is more intense than when they were circulating freely.

The present invention makes it possible for gases penetrating into a glass-drawing chamber to be homogenised by being displaced at the surface of the molten glass bath in a passage which is contracted by refractory elements which extend downwardly until in proximity with the glass surface.

In accordance with the invention, these gases are intimately mixed and the temperature of said gases is made uniform by causing the gases to pass through a chamber disposed in the bottom end of the said refractory elements.

In the arrangement according to the invention, the refractory elements, which isolate the drawing chamber from the remainder of the compartment in the vicinity of the drawn sheet, comprise in their lower end a chamber in which the gases, which are moving at the surface of the molten glass, have the opportunity to become mixed before penetrating into the space formed by the said elements. The mixing chamber is advantageously formed by a longitudinal cavity or recess, preferably of semi-cylindrical form, provided in the lower face of each refractory element.

The gas currents which are directed towards the surface of the molten glass bath are slowed down when they pass into the chamber, in which they are subjected to turbulent movements, which ensure the mixing thereof. When they penetrate into the drawing chamber, they are perfectly homogeneous and their temperature is made uniform; as a consequence, they are incapable of changing the homogeneous nature of the surface layer of the molten glass. It must also be noted that by means of its recess, the lower face of the refractory elements presents a large surface to the radiation of the molten glass, and this improves the homogeneous nature of the latter.

One preferred embodiment of the invention is shown by way of example in the accompanying drawing, in which the single figure is a vertical section through a drawing compartment at right angles to the plane of the drawn sheet.

The working compartment is formed by the arch 1, walls 2 and the base 3. Refractory walls 4 defining the drawing chamber 5 are disposed parallel to the plane of the sheet 6 drawn from the glass bath 7 originating from the melting furnace. The sheet 6 passes between cooling conduits 9 which accelerate the cooling thereof, after which it is entrained either vertically in the shaft of the drawing device or horizontally in the annealing section, depending on the process which is used. The walls 4 comprise an enlarged base 10, disposed very close to the surface of the glass bath 7. A chamber formed by a semi-cylindrical recess 11 is provided in the base 10 over the entire length of the latter. The heterogeneous gas currents represented by the arrows 12 enter beneath the lips 13 of the elements 10 and are dispersed in the chamber 11, where they are expanded and moved in various directions, this ensuring an intimate mixing. These gases then penetrate into the drawing chamber 5 beneath the lip 14 as a perfectly homogeneous stream 15 which is at a uniform temperature. In addition, the superficial glass which advances beneath the elements 10 is subjected to the automatic temperature regulating action by the effect of its radiation towards the large surface of the lower face of these elements.

It is obvious that the invention is not limited to the embodiment which has been described and illustrated by way of example, and it would not constitute a departure from the scope thereof by incorporating modifications.

I claim:
1. In an apparatus for vertically drawing sheet glass from a bath of molten glass, a working compartment connected to glass melting means and containing the bath of molten glass, a drawing chamber formed over a portion of said working compartment and composed of two spaced, vertically disposed, refractory walls located on opposite sides of and in substantial parallelism with the glass sheet drawn from the bath, said parallel refractory walls extending downwardly to points adja- cently above the surface of the molten glass in such bath to provide therebelow gas passages between said working compartment and said drawing chamber, the bottom ends of said refractory walls each having an elongated concavity extending lengthwise of said wall and forming along the outer side of said wall an elongated entry lip for heterogeneous gas currents flowing into said concavity from the surface of said bath outside the area of said drawing chamber, and forming along the inner side of said wall an elongated discharge lip for gas passing from said concavity to said drawing chamber, each of said concavities being formed to constitute a mixing chamber enabling the heterogeneous gases passing under its associated entry lip to expand and intermix into a homogeneous mixture and to be discharged therefrom as a homogeneous stream of uniform temperature beneath said discharge lip thereof and into said drawing chamber.

2. In an apparatus as defined in claim 1, in which the bottom ends of said refractory walls are enlarged to provide enlarged bases closely adjacent to the surface of the bath of molten glass, and in which said concavities open along the lengths of the bottom surfaces of said enlarged bases and have a width in the planes of said bottom surfaces greater than the thickness of said walls above said enlarged bases, the inner surfaces of said concavities and the bottom surfaces of said enlarged bases: of refractory material radiating heat through the gases passing therebeneath to the glass in said glass bath advancing beneath said enlarged bases to the drawing chamber.

References Cited
UNITED STATES PATENTS

| | | | |
|---|---|---|---|
| 813,291 | 2/1906 | Harvey | 65—204 |
| 966,653 | 8/1910 | Colburn | 65—205 |
| 1,718,372 | 6/1929 | Mambourg | 65—204 |
| 2,991,590 | 7/1961 | Brichard | 65—204 |

DONALL H. SYLVESTER, *Primary Examiner.*

G. R. MYERS, *Assistant Examiner.*